Figure 1:
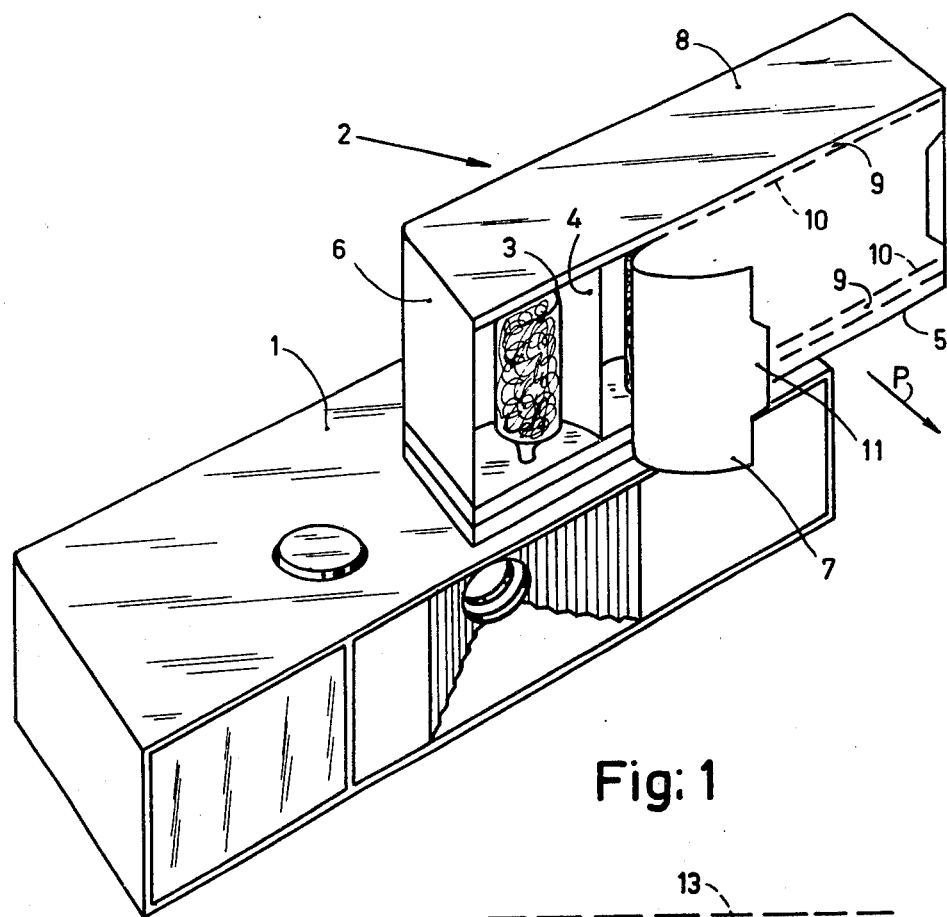

United States Patent [19]
Schmidt

[11] 3,976,870
[45] Aug. 24, 1976

[54] FLASH LAMP UNIT

[75] Inventor: Ernst Machiel Schmidt, Eindhoven, Netherlands

[73] Assignee: U.S. Philips Corporation, New York, N.Y.

[22] Filed: Feb. 21, 1975

[21] Appl. No.: 551,634

[30] Foreign Application Priority Data
Mar. 6, 1974 Netherlands............... 7402999

[52] U.S. Cl. ............................................. 240/1.3
[51] Int. Cl.² ........................................ G03B 15/02
[58] Field of Search............... 240/1.3, 46.17, 46.45, 240/46.47, 46.49, 46.03; 431/93, 95 R

[56] References Cited
UNITED STATES PATENTS

| | | | |
|---|---|---|---|
| 1,332,619 | 3/1920 | Ewing | 240/1.3 |
| 3,491,667 | 1/1970 | Land | 240/1.3 X |
| 3,614,412 | 10/1971 | Bellows | 240/1.3 |
| 3,725,692 | 4/1973 | Miller et al. | 240/1.3 |
| 3,758,768 | 9/1973 | Secura | 240/1.3 |
| 3,763,366 | 10/1973 | Bahnsen | 240/1.3 |

FOREIGN PATENTS OR APPLICATIONS

| | | | |
|---|---|---|---|
| 648,462 | 7/1937 | Germany | 240/46.17 |

*Primary Examiner*—Fred L. Braun
*Attorney, Agent, or Firm*—Frank R. Trifari

[57] ABSTRACT

A flash lamp unit which comprises at least two rows of flash lamps pointing in opposite directions. In one form the flash lamps are covered by a common cap of a transparent material and two or more strips of an opaque material secured to said cap. Each strip covers one row of flash lamps and is removable from the unit independently of the other.

7 Claims, 2 Drawing Figures

U.S. Patent   Aug. 24, 1976   3,976,870

FLASH LAMP UNIT

The invention relates to a flash lamp unit comprising at least two rows of flash lamps with associated reflectors, in which the main direction of light emanation of the lamps of the first row is opposite to that of the lamps of the second row, said flash lamps being arranged inside a transparent cap forming part of the unit. Such a flash lamp unit is known. The main direction of light emanation is to be understood to mean herein that direction in which the strength of irradiated light is maximum.

The said known flash lamp unit comprises a number of electrical or mechanical provisions which are to ensure that during use of the flash lamp unit one of those flash lamps is fired which is associated with the row which is directed towards the object or scene to be illuminated. If unexpectedly one of the flash lamps of the other row should be fired, the possibility exists that the flash light falls directly into the photographer's eye.

It is the object of the invention to provide a simple but efficacious measure to avoid said possibility.

For that purpose, the flash lamp unit of the above-described type is characterized according to the invention in that the cap has at least two strips of an opaque material, which strips are each present opposite to the reflectors of the flash lamps of one row and which can furthermore be removed partly or entirely independently of each other. When the said flash lamp unit is put into use, only that strip is removed entirely or partly which is directed towards the scene or object to be illuminated. The other strip which covers the lamps on the photographer's side remains on the cap and will intercept the flash light if one of the flash lamps directed towards the photographer should be fired. After the flash lamps belonging to the first row have been fired, the flash lamp unit should be turned and the second strip be removed.

It is otherwise to be noted that a flash lamp unit is known inter alia from the U.S. Pat. No. 3,725,692 whose transparent cap is enveloped with a strip of synthetic material which is likewise transparent. However, it is not the object of said strip to intercept the flash light but to reinforce the cap.

The strips of the flash lamp unit according to the invention may be formed from a thin foil of synthetic material or paper which has a suitable adhesive on one side. A favourable embodiment of the flash lamp unit according to the invention, however, is characterized in that each strip is secured to the cap with two parallel edge portions, a part of the strip present between said edge portions and bounded by weakenings in the material, such as grooves, perforations or the like, being removable. The advantage of this embodiment is that only the edge portions of the strips are adhered to the cap so that upon removing the said parts of the strip no adhesive residues remain on the cap. Due to the presence of the perforations or grooves, the strip parts can easily be torn loose.

A further favourable embodiment of the flash lamp unit according to the invention is characterized in that one of the edge portions of the strip is connected to one of the edge portions of the other strip by means of a central strip. In this embodiment it is advantageous that the strips and the central strip can be made from one piece of paper or a synthetic foil. At least one of the free edges of the strips preferably has a projecting lug so as to facilitate the removal of the strips.

A further favourable embodiment of the flash lamp unit according to the invention is characterized in that the strips form part of an electrically conductive roll surrounding the unit. Such a roll forms a Faraday cage and prevents the flash lamps from being fired due to the presence of an electrical field generated outside the unit.

Figure 2:
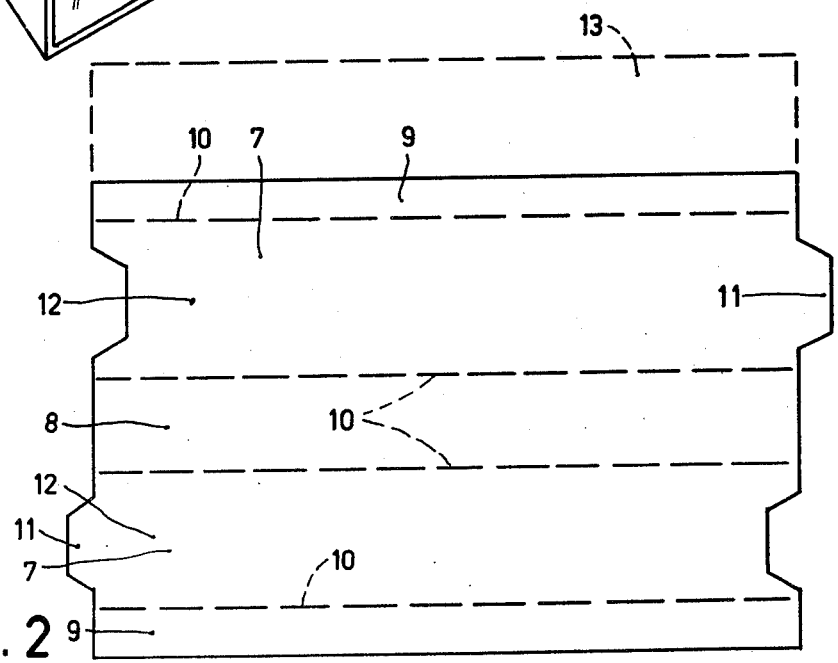

The invention will be described in greater detail with reference to the drawing, in which FIG. 1 shows a flash lamp unit according to the invention mounted on a camera and FIG. 2 shows in a flat plane the assembly of strips, edge portions and central strip.

In FIG. 1, the camera is denoted by 1 and the flash lamp unit by 2. The said unit comprises two rows of combustion flash lamps co-operating with reflectors 4, the lamps 3 of the first row pointing in the direction of the arrow P and the lamps of the second row pointing in the opposite direction. The lamps are arranged on a base plate 5 on which a cap 6 of a transparent material is present.

The cap 6 has two strips 7 of an opaque material, in this embodiment paper, which strips are each present opposite to one row of reflectors.

The strips comprise two parallel edge portions 9 which are secured to the cap by means of an adhesive (see also FIG. 2). The upper edge portions 9 are connected together by means of a central strip 8. In this embodiment the strips 7 have perforations 10 which bound the parts of the strip together. Due to said perforations, the parts 12 of the strip can easily be torn loose. Each strip furthermore comprises a projecting lug 11.

The assembly of strips and central strip may be manufactured from an electrically conductive material, for example aluminum foil, so as to form a Faraday cage which screens the unit from the influence of an electric field generated outside the unit. In that case, for example, one of the edge portions 9 has a widened portion 13 which is denoted by broken lines in FIG. 2. As a result of this a roll is formed which surrounds the unit entirely.

Indications for use and possibly other indications may be printed on the strips, if desired. In addition to the advantage of the increased safety, this provides the additional advantage that said flash lamp unit requires no packaging.

What is claimed is:

1. A flash lamp unit comprising at least first and second rows of flash lamps with associated reflectors, the main direction of light emanation of the lamps of the first row being opposite to that of the lamps of the second row, one of said rows during normal operation facing the object being photographed, and the other facing the photographer, a housing disposed about said flash lamps, said housing including at least one strip of an opaque material, said at least one strip being disposed opposite said first row of reflectors whereby during initial operation of said unit, said second row of flash lamps is used and subsequent thereto, said first strip is removed and said first row of flash lamp is used.

2. A flash lamp unit as claimed in claim 1, wherein a projecting lug is disposed on at least one of the edges of said at least one strip to facilitate removal thereof.

3. A flash lamp unit as claimed in claim 1, wherein said at least one strip forms part of an electrically conductive roll surrounding the unit.

4. A flash lamp unit as claimed in claim 1 wherein said housing includes a second opaque strip disposed opposite to said second row of reflectors, each strip is selectively removable independently of the other, said second strip being removed before intitial operation of said unit.

5. A flash lamp unit as claimed in claim 4, wherein each strip is secured to the housing with two parallel edge portions, a part of each strip being disposed between said edge portions and bounded by means for weakening the material to permit convenient selective removal of said strips.

6. A flash lamp unit as claimed in claim 5, further including a central strip having edges connected to one of the edge portions of said first strip and one of the edge portions of said second strip.

7. A flash lamp unit as claimed in claim 6, wherein a projecting lug is disposed on at least one of the edges of each of the strips to facilitate removal thereof.

* * * * *